June 7, 1960
H. KOCHENDÖRFER
2,939,323
OVERRUNNING CLUTCH
Filed Jan. 20, 1958
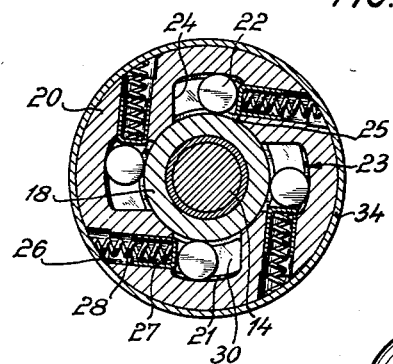
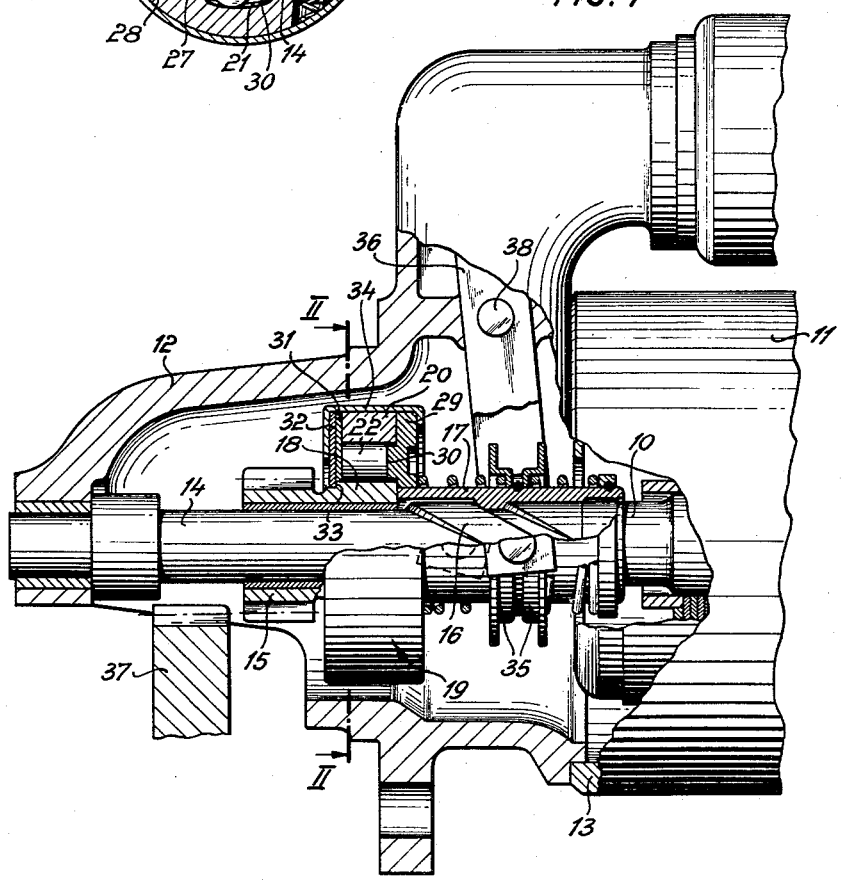
INVENTOR
Heinrich Kochendörfer
by: Michael S. Striker
Attorney

United States Patent Office 2,939,323
Patented June 7, 1960

2,939,323
OVERRUNNING CLUTCH

Heinrich Kochendörfer, Fellbach, Germany, assignor to Robert Bosch G.m.b.H., Stuttgart, Germany Filed Jan. 20, 1958, Ser. No. 710,049

Claims priority, application Germany Jan. 24, 1957

4 Claims. (Cl. 74—6)

The present invention relates to overrunning clutches.

More particularly, the present invention relates to overrunning clutches which are adapted to be used with the starting motor of an internal combustion engine.

Overrunning clutches of this type have several drawbacks. In the first place the power is transmitted through such clutches in a very sudden manner which stresses the parts to a greater extent than where the load is transmitted in a gradual manner, and in the second place such clutches are very noisy in their operation.

One of the objects of the present invention is to provide an overrunning clutch arrangement which is capable of transmitting power in a smooth manner free of shock.

Another object of the present invention is to provide an overrunning clutch arrangement which is far quieter in its operation than conventional overrunning clutches.

Still another object of the present invention is to provide a structure capable of accomplishing the above objects and at the same time composed of simple and ruggedly constructed elements which are very reliable in operation and which can be used wherever conventional overrunning clutches are used.

With the above objects in view the present invention includes in an overrunning clutch arrangement of the above type inner and outer clutch races which are coaxial with each other and one of which drives the other through motion transmitting elements which are located between the races. As is well known the driving race will drive the driven race through the motion transmitting elements until the driven race turns at a faster speed than the driving race. In accordance with the present invention a transmission means cooperates with these races to transmit a drive therethrough, and the transmission means is connected with the races in such a way that the outer race is free to elastically expand due to forces applied thereto by the motion transmitting elements during the time that the driving race drives the driven race.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a partly sectional elevational view of an overrunning clutch arrangement according to the present invention shown in combination with fragmentarily illustrated parts which cooperate with the clutch arrangement; and Fig. 2 is a transverse sectional view of the clutch taken along line II—II of Fig. 1 in the direction of the arrows.

Referring to the drawing, the electric starting motor 11 has an armature shaft 10 which is the drive shaft from which the drive is transmitted to an internal combustion engine, for example, for starting the same. One end of the drive shaft 10 of the starting motor 11 is turnably supported in a bearing 12 which forms a housing for the overrunning clutch arrangement and which is centered and fixed to the housing 13 of the starting motor 11.

The shaft 10 is provided with a smooth cylindrical portion 14 which is surrounded by a pinion 15 which is capable of turning freely on and axially shifting on the cylindrical portion 14 of the shaft 10. This shaft 10 also has a portion 16 surrounded by a sleeve 17 through which the shaft 10 extends in a manner shown in Fig. 1. This portion 16 of the shaft 10 is formed with a thread of a pitch which is large enough to permit the sleeve 17 to shift axially on the shaft 10 when an axial force is applied to the sleeve 17, this sleeve having a projection extending into the thread of large pitch which is formed on the shaft 10 at the portion 16 thereof.

The pinion 15 is integrally connected with an inner race 18 of the overrunning clutch of the present invention, and this inner race 18 is therefore also axially shiftable and freely turnable with respect to the shaft 10. This inner race 18 is the driven race of the clutch. The race 18 is surrounded by an outer driving race 20 which is coaxial with the inner race 18 and which is formed with a plurality of cutouts 21 extending radially into the outer race 20 from the inner periphery thereof, as is most clearly shown in Fig. 2. The cutouts 21 are angularly displaced with respect to each other by 90° about the axis of the outer race 20, and there are four such cutouts 21 each of which extends axially along the entire length of the outer race from its left to its right face, as viewed in Fig. 1. In these cutouts 21 of the outer driving race 20 of the overrunning clutch are respectively located the cylindrical rollers 22 which form motion transmitting elements for transmitting a drive from the outer race 20 to the inner race 18 as long as the latter is not turned by the internal combustion engine at a speed faster than the outer race.

Each of the cutouts 21 is limited by a pair of end faces 24 and 25 and by a surface 23 extending between the end faces 24 and 25 directed toward the inner race 18, and extending along a path which is eccentric with respect to the axis of the clutch. The radial length of the end face 24 of each recess 21 is shorter than the radial length of the end face 25 thereof so that each recess 21 is of a tapering wedge-shaped configuration and becomes smaller in cross section toward its end face 24. The outer race 20 is formed with bores 26 in which tubes 27 are slidable and in which are located springs 28 which respectively extend into and engage the end walls of the tubes 27 for urging the latter into the cutouts 21, respectively, and these end walls of the tubes 27 engage theh rollers 22 for urging the latter toward the end faces 24 of the cutouts 21, respectively. Thus, the springs 28 urge the rollers 22 into wedging engagement between the inner and outer races of the overrunning clutch.

In accordance with the present invention the drive is transmitted through the clutch in a manner which does not prevent the outer race 20 from expanding. This transmission through the clutch is obtained through the connecting means which interconnects the outer driving race 20 with the sleeve 17. This structure includes an annular flange 29 which is fixed to the sleeve 17 at the left end thereof, as viewed in Fig. 1. This flange 29 is provided at its left side face, as viewed in Fig. 1, with a plurality of projections 30 which respectively extend into the cutouts 21, so that there is between the flange 29 and the outer race 20 a connection in the nature of a dog clutch drive. Inasmuch as the projections 30 extend into the cutouts 21 they do not in any way prevent radial expansion of the ring 20. The projections 30 are elongated and in each opening 21 the projection 30 engages the end faces 24 and 25 thereof so that there is a positive driving engagement between the ring 20 and the flange 29. The right end faces of the cylindrical rollers 22, as viewed in Fig. 1, engage the left end faces of the projections 30, and the clutch includes an annular ring 31 which engages the left end faces of the rollers 22, as viewed in Fig. 1. A pair of half rings 32 each of which extends through approximately 180° about the axis of the shaft 10 are located next to each other so as to form a substantially complete ring surrounding the inner race 18, and these half rings 32 engage the shoulder 33 of the inner clutch race 18. A sheet metal sleeve 34 surrounds the clutch and has inwardly directed annular flanges at its opposite ends respectively engaging the flange 29, on the one hand, and the pair of half rings 32, on the other hand, so that the sleeve 34 holds the clutch assembly together. The sheet metal sleeve 34 does not resist radial expansion of the outer race 20 to any appreciable degree.

The sleeve 17 is surrounded by a two-part ring 35 and a bifurcated arm of a two-armed lever 36 cooperates with the ring 35 for shifting the latter axially in a known way. The lever 36 is pivotally supported by a pivot pin 38, and when the lever 36 is turned in a clockwise direction, as viewed in Fig. 1, as by energizing of a solenoid, for example, when the starter button of an automobile or the like is pressed, then the assembly on the shaft 10 is shifted to the left so as to place the pinion 15 in mesh with the gear 37, so that the drive will be transmitted from the pinion 15 to the gear 37. This gear 37 forms part of an unillustrated internal combustion engine, and may form part of the flywheel thereof, for example.

The above-described structure operates as follows:

When the engine is to be started and after the pinion 15 meshes with the gear 37 in the manner described above, the drive is transmitted from the shaft 10 through the sleeve 17 and flange 29 to the outer driving race 20 of the overrunning clutch, and then from the outer driving race 20 through the motion transmitting rollers 22 to the inner race 18 which is integrally connected with the pinion 15 so as to transmit a drive through the latter to the gear 37. The rollers 22 become clamped in the cutouts 21 due to the resistance to the turning of the inner driven race 18 provided by the engine which is to be started. At this time the outer race 20 is capable of elastically yielding in response to the pressure applied thereto by the rollers 22 so that the outer race 20 elastically expands at this time, and it will be noted that the driving engagement between the flange 29 and the outer race 20 does not in any way prevent such expansion of the latter. In other words the projection of the projections 30 into the cutouts 21, respectively, in accordance with the present invention, does not in any way hinder the outward radial expansion of the ring 20. As a result of this elastic yieldability of the outer race of the clutch, the clutch of the present invention operates in a smoother manner than a conventional clutch and also is far quieter than a conventional clutch.

It will be understood that each of the elements described above, or two or more together, may also find a useful application in other types of overrunning clutches differing from the types described above.

While the invention has been illustrated and described as embodied in overrunning clutches of starting motors, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an overrunning clutch arrangement for use with the starting motor for an internal combustion engine or the like, in combination, a drive shaft adapted to be connected to said starting motor to be driven thereby with a given speed; an inner driven race freely turnable on said drive shaft; a pinion fixed to said inner race, said pinion being adapted to be connected to said engine; an outer driving race, said outer race having free lateral end faces extending from the inner to the outer periphery thereof coaxial with said inner race and being adapted to be connected to said drive shaft; motion transmitting elements located between said races for transmitting a drive from said driving to said driven race until said driven race is turned by said engine at a faster speed than said driving race is driven by said starting motor; and connecting means connecting said outer driving race with said shaft for transmitting a drive from said shaft to said outer race without preventing radial expansion of said outer race due to pressure applied thereto by said motion transmitting elements during the time that said outer driving race drives said inner driven race, said motion transmitting elements having a length only slightly smaller than the width of said outer race so that pressure applied to said outer race by said motion transmitting elements will be applied substantially over the whole width of said outer race so as to cause uniform radial expansion thereof to thus provide for a shock free engagement of the outer race by said motion transmitting elements and even wear of the latter.

2. In an overrunning clutch arrangement as recited in claim 1, said outer driving race being formed with a plurality of cutouts extending radially outwardly from the inner periphery of said outer race and said connecting means including a flange surrounding and connected to said shaft to be rotated thereby and having a plurality of projections respectively extending into said cutouts so that said outer race rotates with said flange while at the same time being free to expand radially.

3. In an overrunning clutch arrangement for use with the starting motor of an internal combustion engine or the like, in combination, a drive shaft; an inner race freely turnable on said drive shaft; a pinion fixed to said inner race to rotate therewith, said pinion being adapted to be connected to said engine; an outer driving race surrounding and coaxial with said inner race having free lateral end faces extending from the inner to the outer periphery thereof and said outer race being formed with a plurality of cutouts extending radially into said outer race from the inner periphery thereof and being adapted to be connected to said drive shaft; a plurality of motion transmitting roller elements located in said cutouts for transmitting a drive from said outer to said inner race until the latter is turned by said engine at a speed faster than said outer race is driven by said starting motor; and a drive flange surrounding said shaft and connected thereto to be rotated thereby, said flange having a plurality of projections respectively extending into said cutouts in which said rollers are located for transmitting a drive from the shaft to said outer race so that the latter can drive said inner face through said rollers, said outer race being free to expand radially due to pressure applied thereto by said rollers during driving of said inner race by said outer race, said motion transmitting elements having a length only slightly smaller than the width of said outer race so that pressure applied to said outer race by said motion transmitting elements will be applied substantially over the whole width of said outer race so as to cause uniform radial expansion thereof to thus provide for a shock free engagement of the outer race by said motion transmitting elements and even wear of the latter.

4. In an overrunning clutch arrangement for use with a starting motor of an internal combustion engine, or the like, in combination, a sleeve and a drive shaft extending through said sleeve, said drive shaft and sleeve respectively having inner and outer surfaces directed toward and located closely adjacent to each other, one of said surfaces being formed with a thread and the other of said surfaces having a projection extending into said thread so that the drive shaft and sleeve are threadedly connected to each other and said thread having a pitch large enough to provide axial shifting of said sleeve on said shaft in response to axial pressure applied to said sleeve, said drive shaft adapted to be driven by said starting motor; a flange fixed to and surrounding said sleeve and having a plurality of projections extending from one of its side faces; an outer clutch race located coaxially around said shaft next to said one side face of said flange and being formed with a plurality of cutouts extending radially into said outer race from the inner periphery thereof and respectively receiving said projections of said flange so that the latter is in driving engagement with said outer race, said outer race having free lateral end faces extending from the inner to the outer periphery thereof; an inner race surrounding said shaft and being freely turnable and axially shiftable with respect thereto and surrounded by said outer race, said inner race adapted to be connected to said engine; a plurality of motion transmitting rollers located in said cutouts of said outer race for transmitting a drive from said outer to said inner race as long as said inner race is not turned at a faster speed by said engine than said outer race is driven by said starting motor; and a pinion fixed to said inner race for transmitting a drive therefrom, the connection of said outer race with said flange through the projections of the latter freeing said outer race for radial expansion due to pressure applied thereto by said rollers while said outer race drives said inner race through said rollers, said motion transmitting elements having a length only slightly smaller than the width of said outer race so that pressure applied to said outer race by said motion transmitting elements will be applied substantially over the whole width of said outer race so as to cause uniform radial expansion thereof to thus provide for a shock free engagement of the outer race by said motion transmitting elements and even wear of the latter.

References Cited in the file of this patent

UNITED STATES PATENTS

| | | |
|---|---|---|
| 2,175,876 | Chitlon | Oct. 10, 1939 |
| 2,192,434 | Critchfield | Mar. 5, 1940 |
| 2,211,053 | Critchfield | Aug. 13, 1940 |
| 2,481,249 | Schneider et al. | Sept. 6, 1946 |